(12) United States Patent
Nan et al.

(10) Patent No.: US 7,475,365 B2
(45) Date of Patent: Jan. 6, 2009

(54) METHOD TO ENHANCE NAVIGATION AND SCALABILITY IN TABLE AND TREE VIEWERS

(75) Inventors: Alexandru Paul Nan, Toronto (CA); Marius Slavescu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 10/877,105

(22) Filed: Jun. 25, 2004

(65) Prior Publication Data

US 2005/0289155 A1    Dec. 29, 2005

(51) Int. Cl.
G06F 3/048 (2006.01)
(52) U.S. Cl. .................. 715/854; 715/786; 715/787; 715/818; 715/819; 715/820; 715/829; 715/841; 715/853; 715/855; 709/230; 709/231; 707/100; 707/103; 707/200; 707/10
(58) Field of Classification Search ................. 715/782, 715/786, 787, 818–821, 829, 841, 853–855; 707/10, 11, 100, 103, 104.1, 200; 709/230–231
See application file for complete search history.

(56) References Cited

U.S. PATENT DOCUMENTS

| | | | | |
|---|---|---|---|---|
| 5,463,726 A | * | 10/1995 | Price | 715/797 |
| 5,485,175 A | * | 1/1996 | Suzuki | 715/841 |
| 5,973,695 A | * | 10/1999 | Walsh et al. | 715/854 |
| 6,097,380 A | * | 8/2000 | Crites et al. | 715/246 |
| 6,341,305 B2 | * | 1/2002 | Wolfe | 709/203 |
| 6,348,935 B1 | * | 2/2002 | Malacinski et al. | 715/853 |
| 6,453,241 B1 | | 9/2002 | Bassett, Jr. et al. | 702/19 |
| 6,583,800 B1 | * | 6/2003 | Ridgley et al. | 715/854 |
| 6,628,304 B2 | * | 9/2003 | Mitchell et al. | 715/734 |
| 6,738,787 B2 | * | 5/2004 | Stead | 707/104.1 |
| 6,983,426 B1 | * | 1/2006 | Kobayashi et al. | 715/854 |
| 7,242,413 B2 | * | 7/2007 | Chu et al. | 345/619 |
| 2002/0059202 A1 | | 5/2002 | Hadzikadic et al. | 707/3 |
| 2002/0113816 A1 | * | 8/2002 | Mitchell et al. | 345/734 |
| 2002/0120633 A1 | * | 8/2002 | Stead | 707/104.1 |
| 2003/0160832 A1 | * | 8/2003 | Ridgley et al. | 345/854 |
| 2003/0221162 A1 | | 11/2003 | Sridhar | 715/501.1 |
| 2004/0267600 A1 | * | 12/2004 | Horvitz | 705/10 |
| 2005/0132303 A1 | * | 6/2005 | Grotjohn | 715/853 |
| 2005/0159957 A1 | * | 7/2005 | Roth et al. | 704/276 |
| 2006/0010399 A1 | * | 1/2006 | Lau | 715/853 |
| 2006/0036568 A1 | * | 2/2006 | Moore et al. | 707/1 |

* cited by examiner

*Primary Examiner*—Ba Huynh
*Assistant Examiner*—Nicholas Augustine
(74) *Attorney, Agent, or Firm*—Duke W. Yee; Libby Z. Handelsman; Peter B. Manzo

(57) ABSTRACT

A data model for navigating data. In a preferred embodiment, the data model abides rules that limit the total number of nodes displayable and that limit the number of child nodes displayable beneath a given parent. Collapsed or folded nodes are replaced by embedded navigation controls that indicate the hidden nodes.

4 Claims, 5 Drawing Sheets

METHOD TO ENHANCE NAVIGATION AND SCALABILITY IN TABLE AND TREE VIEWERS

BACKGROUND OF THE INVENTION

1. Technical Field

The present invention relates generally to table and tree viewers, and specifically to navigation and display of items in table and tree viewers.

2. Description of Related Art

Computers are accessed by users through user interfaces. User interfaces typically comprise a visual display that shows data, and users manipulate the display with controls such as mouse and keyboard. In some cases, such as long lists of data, not all the relevant data can be displayed at one time to a user. There are many paging mechanisms that are used to reduce the number of items displayed at any given time, allowing representation of a large amount of data without actually displaying the data itself. Existing paging mechanisms and user interfaces do not allow multi-level partitioning, and are also external to the data itself. A typical example is a scroll bar, allowing a user to scroll down a list, displaying different parts of the list as the scroll bar is moved. However, these existing paging mechanisms do not provide quick access to all parts of a large list, and usually function by allowing the user to browse an entire list, tree, or table piece by piece.

Therefore, the art would be improved by introducing a scalable tree viewer that allows display of different parts of a data model (such as a tree or table) using embedded navigation controls.

SUMMARY OF THE INVENTION

The present invention teaches a system and method of displaying nodes in a data model. In one preferred embodiment, the innovations comprise replacing one or more nodes in a data model with an embedded navigation control when a total number of visible nodes exceeds a predetermined number. Other embodiments also include replacing one or more child nodes in the data model with an embedded navigation control when a total number of child nodes beneath a given parent node exceeds a predetermined number. Other aspects of the present invention are described more fully below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
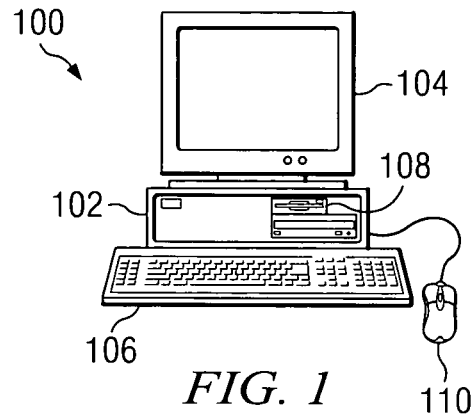
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
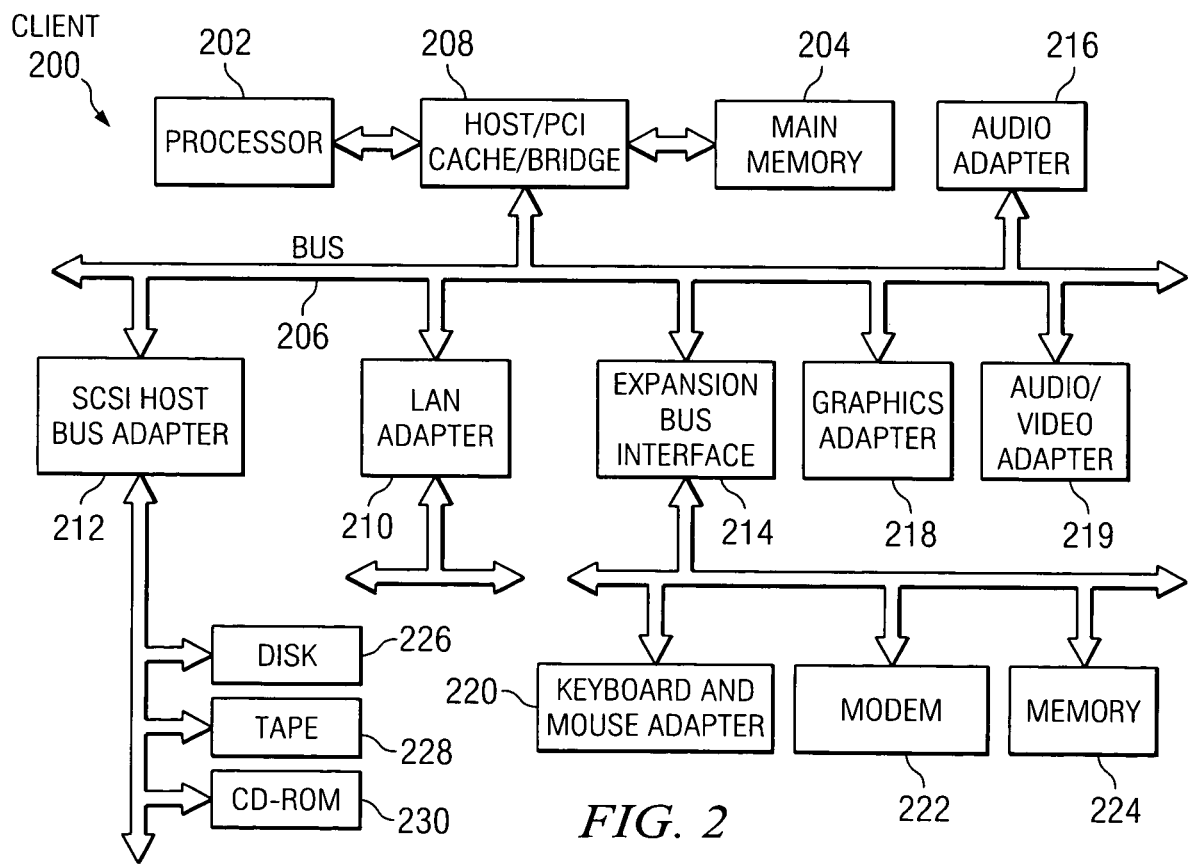
FIG. 2 shows a diagram of components of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides an efficient way to create a scalable interface (such as a tree viewer, table, or other data model) by embedding navigation controls within the data items of the interface. Using the innovative paging mechanism allows a viewer to display different regions of a data model (for example, in a tree view) by partitioning and folding the children list on each level. The resulting viewport represents a projection of different partitions of the tree model. This allows the user to view different partitions of a tree model at the same time. These innovations also allow quick access to navigation controls with an intuitive visual representation of position context information.

Though the following examples are discussed in terms of a data tree, it is noted that the innovations herein described can be implemented in other types of data models or structures as well, such as in nested lists and tables.

Scalability is obtained by limiting the number of model items (such as an item in a list) loaded into memory and by limiting the number of items displayed in the viewer. Scalability in large trees is more difficult to achieve because of the complexity of tree structures. Tree structures and other large data models can become very complex and hard to manage. In one embodiment, the innovative approach of the present invention provides a scalable tree representation and a corresponding user interface (UI) metaphor of a tree based data model following these rules: First, the number of child tree items displayed on every tree level (or parent node) is limited; second, the total number of tree items displayed at some point in time in the viewer is limited. Thus, the present invention provides means to both compress lists within the tree, and means to compress the tree itself.

The first rule is satisfied by a paging mechanism on a tree item basis. For example, consider a tree item that has a list of children (items nested within the parent item). The list is partitioned into subsets of a configurable number of nodes. The total number of nodes can be denoted N. In order to provide a scalable visual representation of the list, only a page (sequential set of nodes) of N nodes is displayable at a time. However, if a tree node is expanded in the tree and the corresponding list of child nodes (revealed when the parent node was expanded) contains more than N elements, the paging mechanism of the present invention automatically creates a partition of the list (i.e., it truncates the displayed list) and displays only the first N elements. The present innovations also displays "PageUp" and "PageDown" controls for displaying more of the truncated list of nodes. This is described further below.

The second rule is satisfied by replacing a sub tree (or part thereof) with a navigation control whenever the total number of nodes exceeds a predetermined, configurable number. For example, assume only M nodes are capable of being displayed at a time. Consider a tree viewer having M−K+1 tree nodes displayed, and a node containing more than K child nodes is expanded. This would expand the list to display greater than M nodes. Therefore, a tree collapsing mechanism comes into action and decides to collapse part of the tree and replace it with a control node (such as "GoToParent", "LevelUp", "LevelDown", "GoToChildren", "PageUp", or "PageDown") in order to reduce the number of displayed tree nodes to M and also to provide a way to navigate back to the collapsed sub tree when needed.

Depending on the position of the expanded node, a number of corresponding nodes from different areas of the tree will be collapsed in order to provide a window or view port of no more than the allowed M visible tree nodes to the user. Using the innovative navigation controls the view port can be reconfigured so that hidden nodes are revealed. Thus, expanding and collapsing nodes in the viewport will change the state of the view port.

Figure 3:
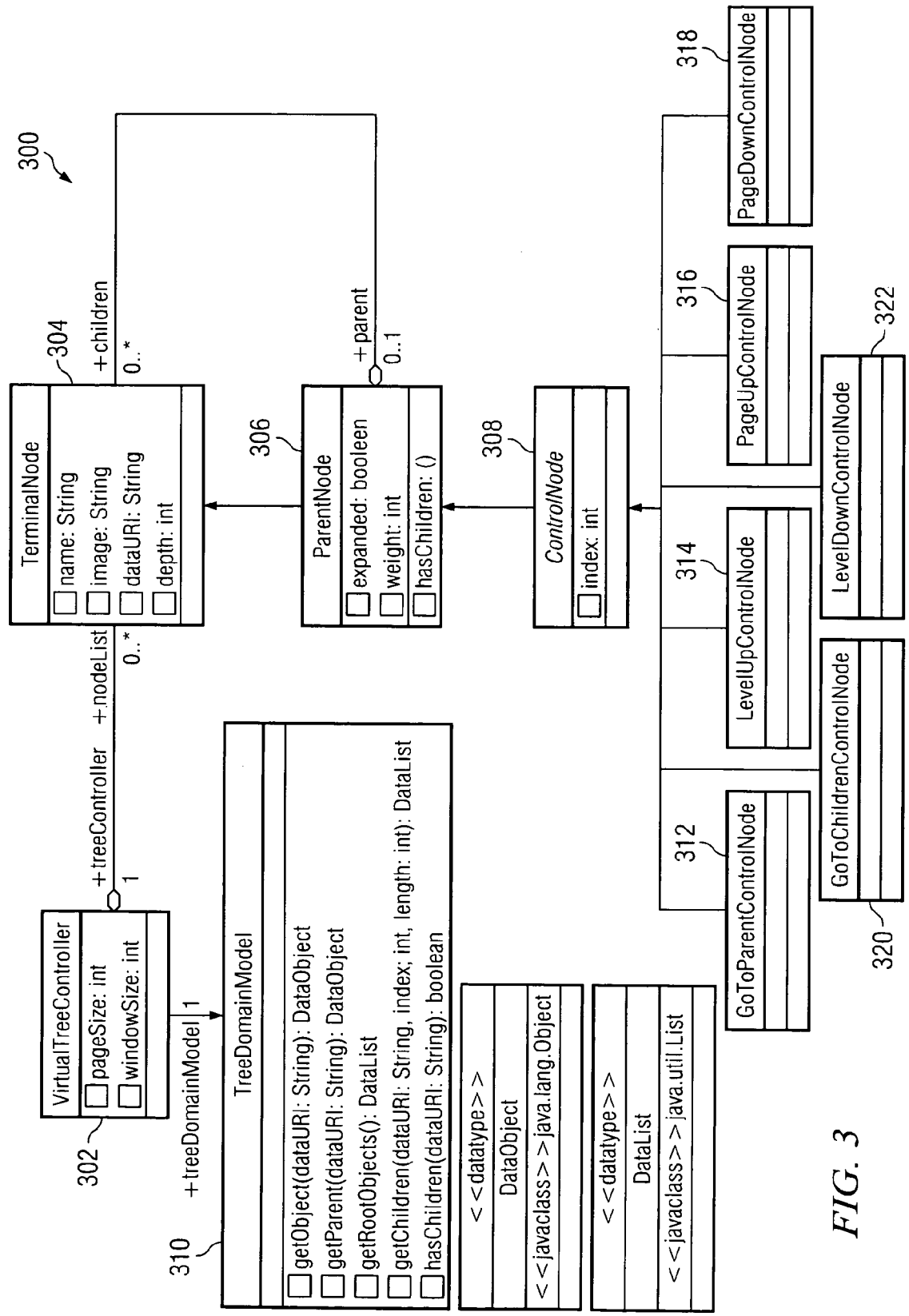
FIG. 3 shows an object model of a virtual tree controller consistent with a preferred embodiment of the present invention.

FIG. 3 shows a diagram of the model associated with one embodiment of the present invention. This model 300 shows the basis for the paging and collapsing mechanism. The model contains a virtual tree controller 302, which is the object that manages tree nodes and controls the behavior of the virtual tree. Tree nodes can be of three types: TerminalNode 304 which is a node that doesn't have children; ParentNode 306 which is a node that contains children; and ControlNode 308 which is a helper node that allows navigation along the virtual tree. Note that TerminalNode 304 is the base type from which the other two types inherit. The base type contains two important properties, data URI (basically hierarchical ID), used to query the domain model for the corresponding data object, and depth which represents the depth in the tree from the root node (for example, the root has depth 0, children of the root have depth 1, etc.). The ParentNode 306 contains a property which keeps its expansion status. The index property of ControlNode 308 keeps the index of the node it replaces, in the list of child nodes of its parent. This property is needed by the virtual tree controller in order to restore a tree node from a tree control that was replacing it. Tree nodes will be populated with data from a tree domain model 310. The virtual tree controller 302 keeps a reference to the tree domain model 310 which provides an interface for accessing domain model objects using URIs. The virtual tree is populated by querying the domain model for the required objects.

FIG. 3 also shows the possible aspects of ControlNode 308, including GoToParent 312, LevelUp 314, PageUp 316, PageDown 318, GoToChildren 320, and LevelDown 322. These control nodes and their functions are discussed further below.

Figure 4:
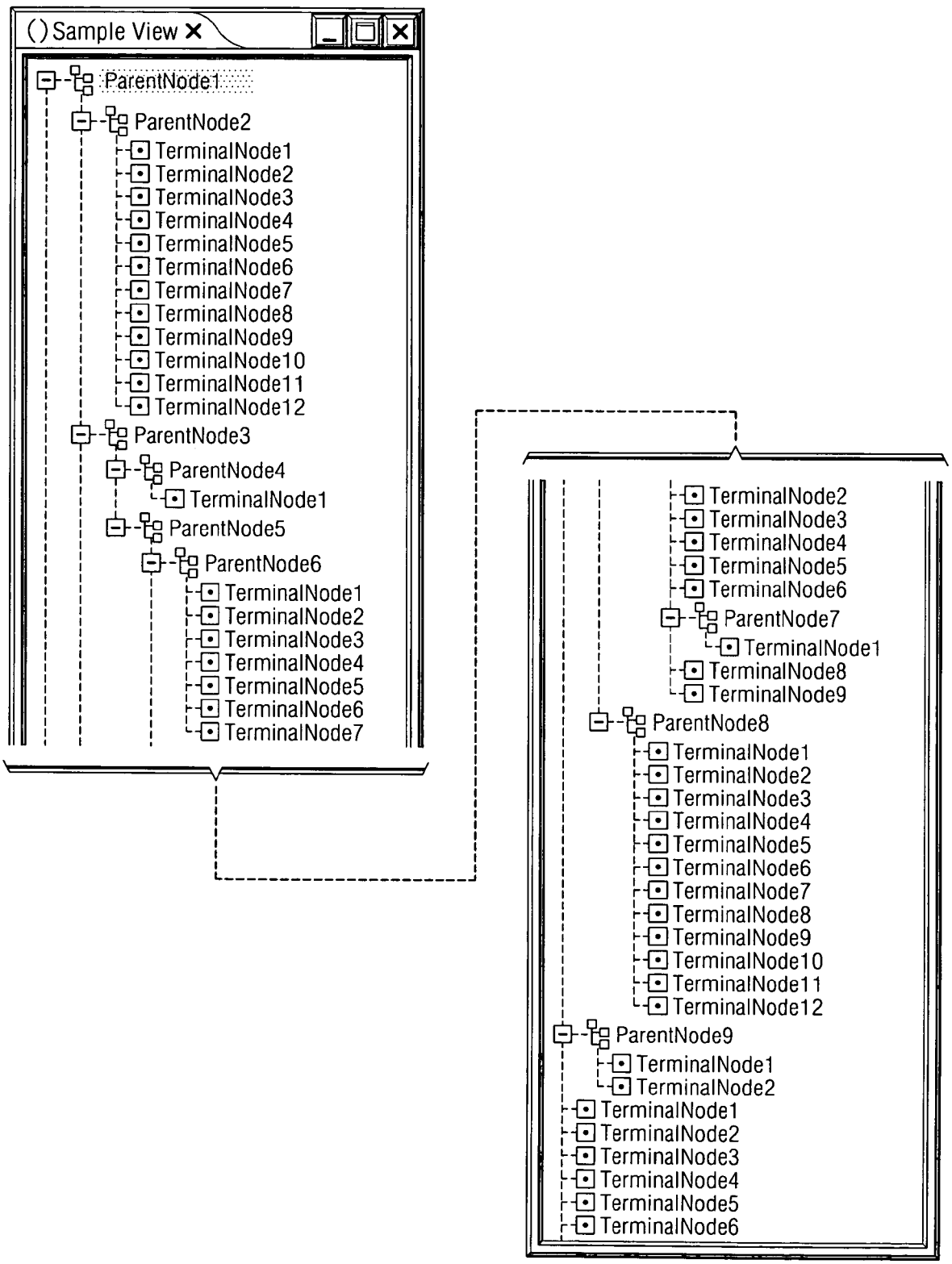
FIG. 4 shows a view of a data model consistent with a preferred embodiment of the present invention.
Figure 5:
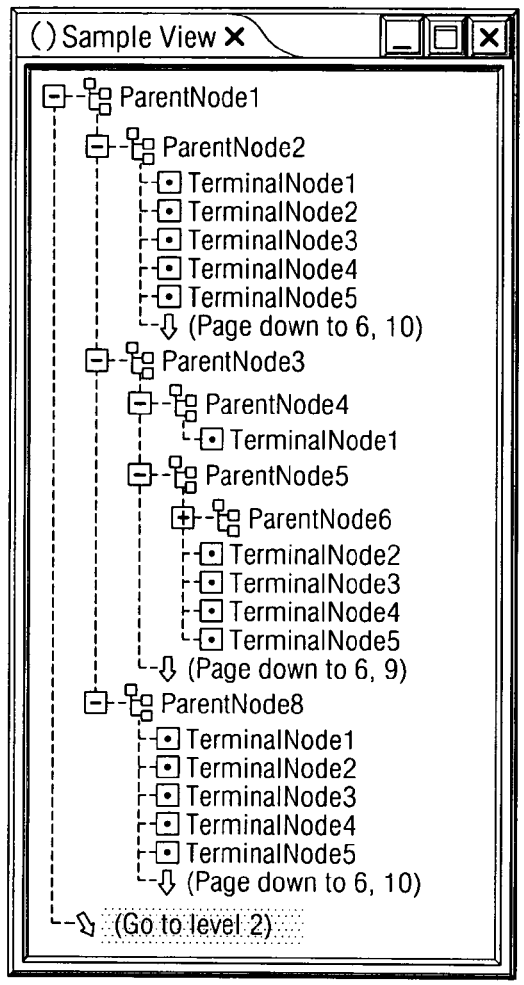
FIG. 5 shows a view of a data model consistent with a preferred embodiment of the present invention.

FIG. 4 shows a view of a data model (in this example, a tree) with all nodes visible. This results in a large tree that requires a large viewport to display all nodes. FIG. 5 shows the same tree with child elements paged and not more than 30 nodes allowed to be displayed at a time. Further, no more than 5 child nodes of any single parent can be displayed at one time. In this example situation, we assume a tree node having a number of K child nodes is expanded. Generally speaking, in order to display all K child nodes we must cut K nodes from the tree and provide navigation controls in order to be able to navigate back to the hidden nodes. A node that has hidden parents and siblings above will be replaced by a "LevelUp" marked by a left-up oblique arrow. A node that has a hidden parent but is the first in the list of children, i.e., which doesn't have siblings above it, will be replaced by a "GoToParent" marked by a left arrow. The "PageUp" and "PageDown" controls are used to provide navigation support on a list of child nodes that has more than N elements. A "PageUp" in a list shows that the list has more elements above it and the "PageDown" shows that the list has more elements below it. Nodes that have hidden siblings and children are replaced by a "LevelDown" marked by a right-down oblique arrow. A node that has only hidden children is replaced by a "GoToChildren" control marked by a right arrow.

Figure 6:
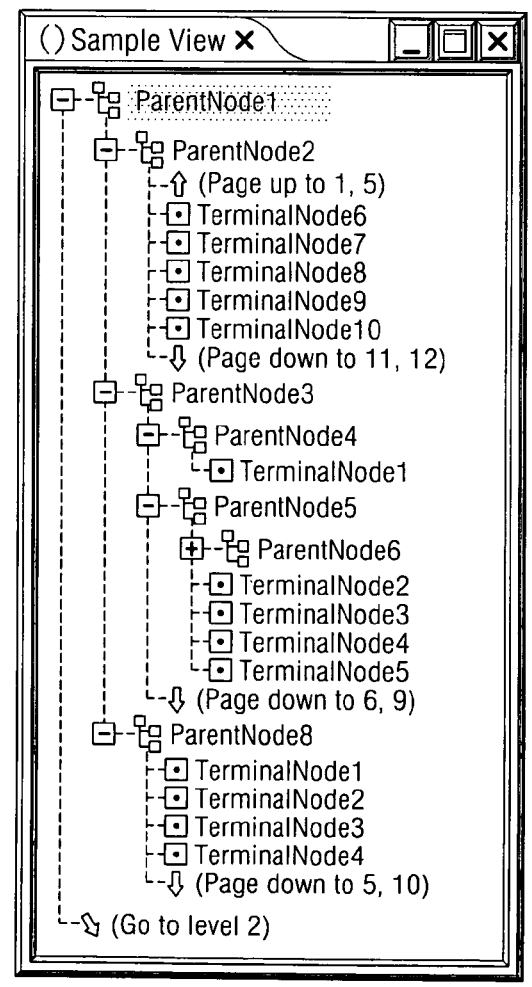
FIG. 6 shows a view of a data model consistent with a preferred embodiment of the present invention.

Returning to FIG. 5, since no more than 30 nodes can be displayed in this example, and no parent can have more than five children, some child elements are paged (i.e., hidden from view and replaced by a navigation control). In this example, ParentNode1 (the root of the tree) has several children that have been replaced. For example, ParentNode9 and TerminalNode1 through TerminalNode 6 have been replaced by a LevelDownControlNode. ParentNode6 has been collapsed. Also of importance, TerminalNodes 6-12 of ParentNode2 have been replaced. In this example, the paging mechanism, i.e., the navigation control, states, "Page down to 6, 10). Hence, in this example, the page mechanism allows the user to select this option to display TerminalNodes 6-10. If that were done, TerminalNodes 11 and 12 would still be represented by a navigation control option (comporting with a configurable rule that only 5 children can be displayed for any parent), as would be TerminalNodes 1-5. This situation is shown in FIG. 6.

Figure 7:
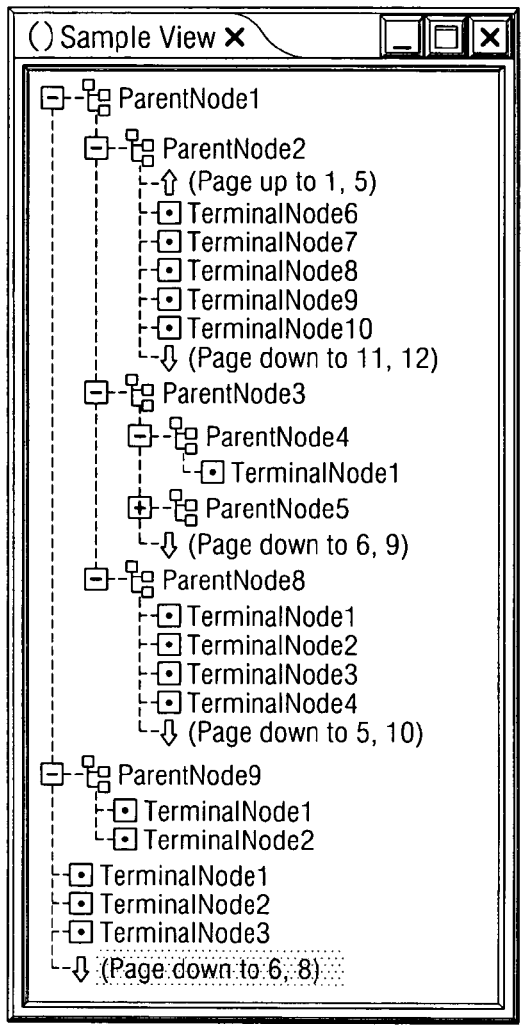
FIG. 7 shows a view of a data model consistent with a preferred embodiment of the present invention.

Next the navigation control "Go to level 2" is selected, and the result shown in FIG. 7. ParentNode5 is collapsed in this example, and ParentNode9 is displayed, along with the other five nodes below (2 children, 3 siblings). Remaining siblings below ParentNode9 are displayed using a navigation control, "Page down to 6,8".

Figure 8:
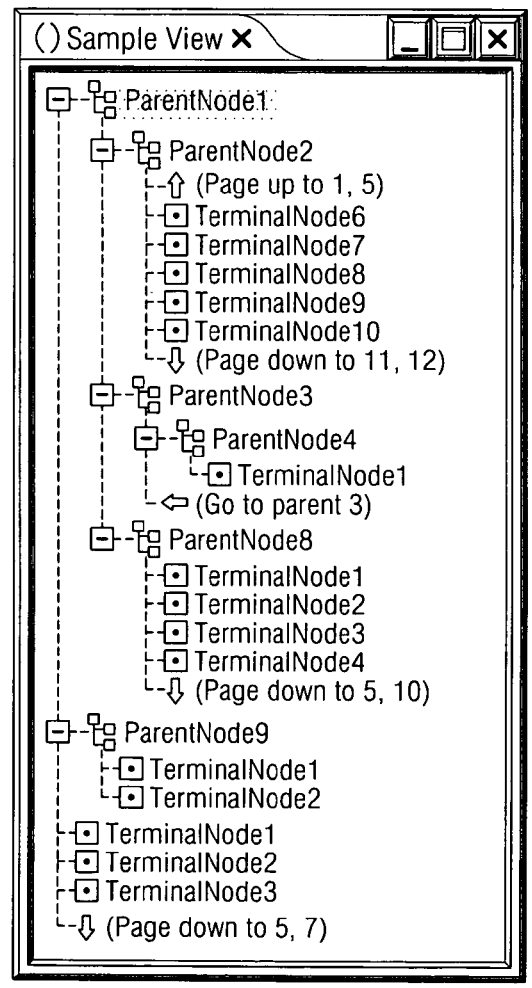
FIG. 8 shows a view of a data model consistent with a preferred embodiment of the present invention.

FIG. 8 shows the same situation, except in this case ParentNode5 is not compressed in the normal way. It is instead represented using the innovative navigation controls. In this example, the navigation control "Go to parent 3" links to the ParentNode5, its children, and ParentNode6. These nodes have been "folded" so they are not displayed, but can be accessed by selecting the relevant navigation control. In this way, non-adjacent parts of the tree can be displayed next to one another separated only by a navigation control representing hidden or folded nodes. This attribute of the present invention allows easier viewing and management of large data structures that would normally exceed a viewport's size.

Though many navigation controls could be used to implement the present invention, preferred embodiments follow the following convention for control node extensions: "page up" with an up arrow indicates control for jumping to the previous page; "page down" with a down arrow represents control for jumping to the next page; "level up" is the control for revealing the previous level; "level down" is the control for revealing the next level; "go to parent" is the control for revealing the parent level; and "go to children" is the control for revealing the children level.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system of displaying nodes in a scalable data model, comprising the computer implemented steps of:

determining whether a total number of visible nodes in the scalable data model exceeds a first configurable predetermined number;

replacing one or more nodes in the scalable data model with an embedded navigation control when the total number of visible nodes exceeds the first configurable predetermined number to automatically partition the scalable data model into one or more subsets, wherein the embedded navigation control is placed in a same position within the scalable data model as the one or more nodes that were replaced, and wherein the embedded navigation control identifies the one or more nodes that were replaced, and wherein the embedded navigation control is selected from a group of embedded navigation controls, and wherein the group of embedded navigation controls consists of a page up navigation control for jumping to a previous page of child nodes marked by an up arrow, a page down navigation control for jumping to a next page of child nodes marked by a down arrow, a level up navigation control for revealing a previous level of parent and sibling nodes marked by a left-up oblique arrow, a level down navigation control for revealing a next level of parent and sibling nodes marked by a right-down oblique arrow, a go to parent navigation control for revealing a parent level that does not include any sibling nodes marked by a left arrow, and a go to children navigation control for revealing a children level that only includes child nodes marked by a right arrow; and replacing one or more child nodes in the scalable data model with the embedded navigation control when a total number of child nodes beneath a given parent node in the data model exceeds a second configurable predetermined number.

2. The method of claim 1, wherein the scalable data model is a tree.

3. A method in a data processing system of displaying nodes in a scalable data model, comprising the computer implemented steps of:

determining whether a total number of visible child nodes beneath a parent node in the scalable data model exceeds a configurable predetermined number; and replacing one or more child nodes in the scalable data model with an embedded navigation control when the total number of visible child nodes beneath the parent node exceeds the configurable predetermined number to automatically partition the scalable data model into one or more subsets, wherein the embedded navigation control is placed in a same position within the scalable data model as the one or more child nodes that were replaced, and wherein the embedded navigation control identifies the one or more child nodes that were replaced, and wherein the embedded navigation control is selected from a group of embedded navigation controls, and wherein the group of embedded navigation controls consists of a page up navigation control for jumping to a previous page of child nodes marked by an up arrow, a page down navigation control for jumping to a next page of child nodes marked by a down arrow, a level up navigation control for revealing a previous level of parent and sibling nodes marked by a left-up oblique arrow, a level down navigation control for revealing a next level of parent and sibling nodes marked by a right-down oblique arrow, a go to parent navigation control for revealing a parent level that does not include any sibling nodes marked by a left arrow, and a go to children navigation control for revealing a children level that only includes child nodes marked by a right arrow.

4. The method of claim 3, wherein the scalable data model is a tree.

* * * * *